United States Patent
Hunter et al.

(10) Patent No.: US 7,042,355 B2
(45) Date of Patent: May 9, 2006

(54) ENVIRONMENTAL CAMERAS

(75) Inventors: Andrew Arthur Hunter, Bristol (GB); Glenn Peter Hall, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 196 days.

(21) Appl. No.: 10/073,727

(22) Filed: Feb. 11, 2002

(65) Prior Publication Data
US 2002/0149680 A1 Oct. 17, 2002

(30) Foreign Application Priority Data
Feb. 20, 2001 (GB) ................................ 0104080.7

(51) Int. Cl.
*G08B 13/00* (2006.01)
(52) U.S. Cl. ...................... 340/541; 340/540; 340/426; 340/429; 340/937; 340/539.26; 348/143; 348/152; 348/153; 348/154; 348/155
(58) Field of Classification Search ................ 340/541, 340/540, 426, 429, 937, 539, 539.17, 539.26; 348/143, 152, 153, 154, 155
See application file for complete search history.

(56) References Cited

U.S. PATENT DOCUMENTS

| | | | | |
|---|---|---|---|---|
| 4,857,912 A | * | 8/1989 | Everett et al. | ............... 340/508 |
| 5,309,144 A | * | 5/1994 | Lacombe et al. | ....... 340/539.23 |
| 5,448,320 A | * | 9/1995 | Sakai et al. | ................. 396/427 |
| 5,777,551 A | * | 7/1998 | Hess | ........................... 340/541 |
| 5,946,404 A | * | 8/1999 | Bakshi et al. | ................ 382/103 |
| 6,052,052 A | * | 4/2000 | Delmonaco | .................. 340/539 |
| 6,313,872 B1 | * | 11/2001 | Borg | .......................... 348/155 |
| 6,433,683 B1 | * | 8/2002 | Robinson | ..................... 340/540 |
| 6,658,091 B1 | * | 12/2003 | Naidoo et al. | ................. 379/37 |
| 2002/0075134 A1 | * | 6/2002 | Schieke et al. | ............. 340/10.4 |

FOREIGN PATENT DOCUMENTS

| | | |
|---|---|---|
| GB | 2374968 A | 10/2002 |
| JP | 2000209568 | 7/2000 |
| JP | 2001112031 | 4/2001 |
| WO | WO02/21471 A1 | 3/2002 |

* cited by examiner

*Primary Examiner*—Tai T. Nguyen
(74) *Attorney, Agent, or Firm*—Thomas, Kayden, Horstemeyer & Risley LLP

(57) ABSTRACT

An image capture detection system including a short range radio transmitter (13) and a short range radio receiver and decoder (12) installed in or on an image capture device (10). The system further comprises a remote detection unit (14) also comprising a short range radio transmitter (18) and a short range radio receiver and decoder (16). In use, the remote detection unit (14) transmits intermittent query signals (22) which are received by the receiver (12) in the image capture device (10) when the remote detection unit (14) is within a predetermined distance or range thereof. In response to receipt of the query signals (22), the transmitter (13) in the image capture device (10) is arranged to transmit an indicator signal (24) which is received by the remote detection unit (14). The remote detection unit (14) is arranged to generate a warning signal in response to receipt of the indicator signal ((24).

52 Claims, 1 Drawing Sheet

ENVIRONMENTAL CAMERAS

BACKGROUND OF THE INVENTION

1. Field of the Invention

This invention relates to cameras and, in particular but not exclusively, to video cameras and the like such as those used in public places for security and/or surveillance.

2. Related Background Art

The use of cameras in public places for security purposes is becoming increasingly common, particularly as cameras become cheaper and easier to manufacture. For example, video cameras and other image capture devices are commonly used in retail outlets and the like in an attempt to combat shoplifting and in other public places in an attempt to combat vandalism and other crimes. Such devices act as a deterrent as well as providing video evidence if a crime is committed.

As the use of surveillance cameras becomes more common, and image capture devices become more accessible to the public in general, so the concern of the public increases regarding the potential for an invasion of their privacy. At present, in an attempt to allay such fears, image capturing devices employed in public places are made visually conspicuous and signs indicating their presence are usually displayed.

However, this solution is not always ideal especially where the optimization of space is an issue. Current technology already permits the manufacture of very small but powerful image capturing devices which, for the reasons outlined above, are then housed in relatively large casings so that they will be visually conspicuous. Not only is this an inefficient use of space and materials, but it does not prevent the unauthorized use of hidden surveillance cameras, which leads to mistrust and discomfort for the general public. It is generally felt that the general public should have the right to be made aware of situations and locations where they may be watched, and current protocols are not considered to achieve this effectively in many circumstances.

SUMMARY OF THE INVENTION

We have now devised an arrangement which seeks to overcome at least some of the problems outlined above. In accordance with the present invention, there is provided image capture device detection system, comprising indicator unit arranged to be installed in or on an image capture device, said indicator unit being configured to emit an indicator signal in response to an external stimulus to indicate the presence of said image capture device.

The present invention also extends to an image capture device including a detection system as defined above.

Methods of detecting the external stimulus will depend on the nature of the stimulus. For example, if it is a noise, a microphone could be used. Alternative detectors include a passive infra-red detector, radar-based motion detector, identifying motion in camera images, etc.

It is envisaged to provide a protocol whereby it is compulsory to provide such an indicating unit on or in all image capturing devices which are intended to be or could be used in public places to observe the general public.

In one embodiment of the invention, the image capturing device may include a warning device for generating an audible and/or visible signal in response to an external signal from, for example, a member of the general public. In its simplest form, the external signal could, for example, be a hand clap. However, in a preferred embodiment, a remote detection unit may be provided (possibly in a wristwatch or personal organizer) which transmits intermittent interrogation signals that can be received by an image capturing device within a predetermined area, causing it to emit a signal which is either audible and/or visible to the user of the remote unit, or which can be received by the detection unit, causing the detection unit to emit an audible and/or visible signal to alert the user of the presence of a camera in the vicinity. Alternatively, the detection unit may be arranged to vibrate. The detection unit may also have a 'silence' mode in which the user is not alerted to the presence of a camera immediately.

In yet another embodiment of the invention, the image capturing device is simply arranged to transmit intermittent signals which, when received by a remote detection unit, cause said detection unit to emit an audible, visible and/or tactile signal to alert the user of the presence of a camera in the vicinity.

In any event, the remote detection unit may be arranged to alert the user of the presence of the cameras when specifically requested to do so, and it may be arranged to require explicit interaction from the user if it is required to review details of any cameras detected.

In one particularly preferred embodiment of the invention, the image capture device may include a radio receiver and decoder to receive and detect a query signal from a nearby remote detection unit. The image capture device would preferably also include a short range radio transmitter which, in response to the query signal, transmits a radio signal which may include one or more of the following: an identifier signal unique to that particular image capturing device (such as would be necessary for the remote detection unit to address the image capturing device over a wireless network), a code indicating the image capture device's capabilities, status information (i.e. which, if any, of its capabilities are active), details of the person or entity responsible for the image capture device and/or details of the people or groups of people authorized to access the images captured by the device, and even those accessing the images at any particular time. It may be compulsory for a person or entity to have a license to use covert image capturing devices, in which case the radio signal may include license details and/or the fact that the camera is not licensed. In another embodiment, similar, details could be provided by the remote detection unit to the camera(s), e.g. what camera details are being requested, by whom, for what purpose, etc. Details sent to the camera could include details of a return communication channel, e.g. an e-mail address, to which the details should be sent, or the detector's wireless device address to enable a non-broadcast wireless communication with the camera.

The remote detection unit beneficially includes a display on which at least some of the information transmitted by the image capture device is displayed to the user. The remote detection unit may also include a storage device so that it can store information received from one or more image capture devices detected within a predetermined area.

BRIEF DESCRIPTION OF THE DRAWING

Exemplary embodiments of the invention will now be described in more detail with reference to the accompanying drawing which is a schematic block diagram representing an image capture device detection system according to the invention.

DETAILED DESCRIPTION OF THE PREFERRED EMBODIMENTS

Figure 1:
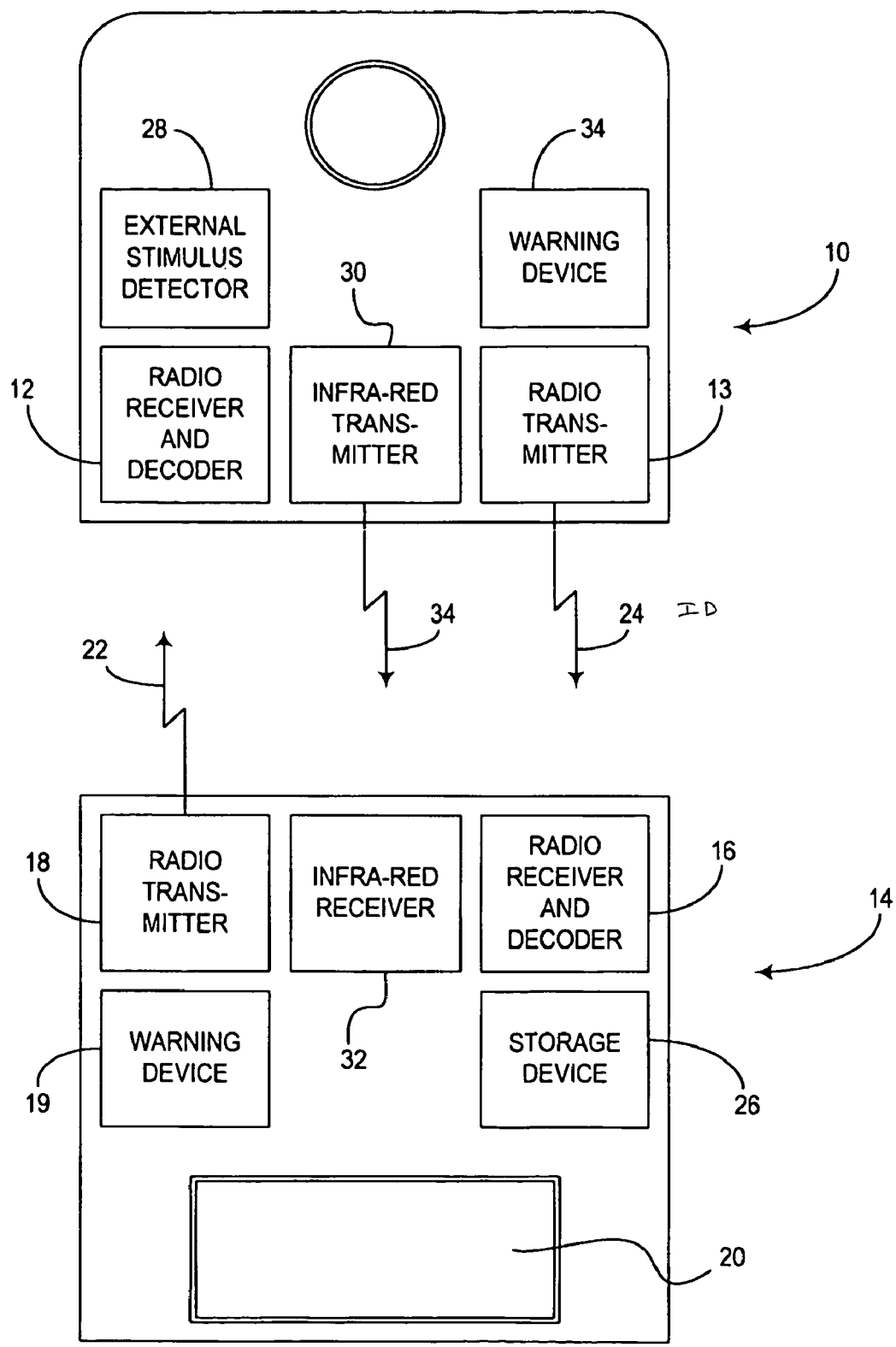

Referring to FIG. 1, a camera 10 according to an exemplary embodiment of the present invention has incorporated therein a short range radio receiver and decoder 12 and a short range radio transmitter 13.

A remote detection unit 14 carried or worn by a user also comprises a short range radio receiver and decoder 16 and a short range radio transmitter 18. The remote detection unit 14 further comprises a display screen 20.

The radio transmitter 18 in the remote detection unit 14 transmits intermittent query signals 22. When the remote detection unit 14 is within a predetermined range or distance of the camera 10, the receiver and decoder 12 in the camera 10 receive the query signal(s) and, in response thereto, transmit a short range radio signal 24 which is received by the remote detection unit receiver and decoder 16.

One known protocol which could be used to achieve this is provided by the Bluetooth.™. technology which permits instant, wireless connections to be made between various devices having a microchip incorporating a radio transceiver built into them, and supports both point-to-point and point-to-multipoint connections. This technology facilitates fast and secure transmissions of data, even when the devices are not within line-of-sight, and because it uses radio transmission, transfer of data is in real-time. The Bluetooth.™. radio operates in a globally available frequency band which enables communication compatibility worldwide, and the technology is designed to be fully functional even in very noisy radio environments. Further, all data is protected by error-correction protocols, as well as encryption and authentication routines for the users' privacy.

In this embodiment, the radio signal 24 includes a unique identifying signal, a code indicating the camera's capabilities, status information and information relating to the person or entity responsible for the camera. The decoder 16 in the remote detection unit 14 decodes the radio signal 24 and displays some or all of said information on the display screen 20. The remote detection unit 14 may further comprise a storage device 26 for storing information included in the radio signal 24.

The camera 10 may further include a sensor 28, such as an external stimulus detector, which detects external stimuli. The external stimulus detector 28 may be an audible sensor, such as a microphone, for sensing an audible signal or noise. Alternatively, the external stimulus detector 28 may be a motion detecting device, such as a passive infrared detector, a radar-based motion detector, or a device for detecting motion from the changes observed in camera images. An arrangement of a motion detecting system for detecting the presence of a camera may further include an infrared transmitter 30 in or on the camera 10 and a corresponding infrared receiver 31 in or on the remote detection unit 14.

The camera 10 may include a warning device 34 that generates an audible and/or visible signal. The warning device 34 may emit a signal in response to an external stimulus detected, for instance, by the external stimulus detector 28. Alternatively, the warning device 34 may emit a signal in response to a query signal 22 or interrogation signal received by the radio receiver 12.

Referring to FIG. 1 again, in an alternative embodiment, a camera 10 according to an exemplary embodiment of the present invention has incorporated therein a receiver and decoder 12 for receiving wireless query signals 22 and a transmitter 13 for transmitting wireless indicator signals 24.

A remote detection unit 14 carried or worn by a user comprises a receiver and decoder 16 for receiving wireless indicator signals 24 and a transmitter 18 for transmitting wireless query signals 22. The remote detection unit 14 further comprises a warning device 19 and/or display screen 20.

A specific embodiment of the present invention has been described above by way of example only, and it will be apparent to a person skilled in the art that modifications and variations can be made to the described embodiment without departing from the scope of the invention as defined in the appended claims.

The invention claimed is:

1. A detection system for detecting the presence of an image capture device in the vicinity of a person, the detection system comprising an indicator unit installed in or on the image capture device, the indicator unit being configured to emit an indicator signal to the person to indicate the presence of the image capture device in the vicinity of the person, whereby detection of the indicator signal by a remote detection unit causes the remote detection unit to alert the person of the presence of the image capture device.

2. The detection system of claim 1, wherein the indicator unit emits the indicator signal in response to an external stimulus.

3. The detection system of claim 2, wherein the image capture device further comprises a sensor arranged to sense the external stimulus.

4. The detection system of claim 3, wherein the sensor is an acoustic detector.

5. The detection system of claim 3, wherein the sensor is a motion detector.

6. The detection system of claim 3, further comprising the remote detection unit having a radio transmitter, wherein the sensor of the image capture device is a radio receiver arranged to receive a query signal transmitted by the radio transmitter of the remote detection unit when the remote detection unit is within a predetermined range of the image capture device.

7. The detection system of claim 1, wherein the indicator unit is a warning device and the indicator signal is an alarm signal.

8. The detection system of claim 7, wherein the alarm signal is an audible signal.

9. The detection system of claim 7, wherein the alarm signal is a visible signal.

10. The detection system of claim 1, wherein the indicator unit is a radio transmitter and the indicator signal is a radio signal.

11. The detection system of claim 10, wherein the radio transmitter is arranged to emit radio signals periodically.

12. The detection system of claim 10, wherein the radio transmitter is arranged to emit radio signals continuously.

13. The detection system of claim 10, further comprising the remote detection unit carried by the person, the remote detection unit having a radio receiver arranged to receive radio signals transmitted by the radio transmitter of the image capture device when the remote detection unit is within a predetermined range of the image capture device.

14. The detection system of claim 13, wherein the remote detection unit further comprises a warning device to indicate the presence of the image capture device in the vicinity of the person.

15. The detection system of claim 14, wherein the warning device emits an audible alarm signal.

16. The detection system of claim 14, wherein the warning device emits a visible alarm signal.

17. The detection system of claim 14, wherein the warning device emits a tactile alarm signal.

18. The detection system of claim 13, wherein the remote detection unit further comprises a display screen arranged to display information carried by the radio signal.

19. The detection system of claim 18, wherein the display screen is arranged to indicate the presence of the image capture device in the vicinity of the person.

20. The detection system of claim 18, wherein the display screen is arranged to display information indicating the capabilities of the image capture device.

21. The detection system of claim 18, wherein the display screen is arranged to display information indicating the status of the image capture device.

22. The detection system of claim 18, wherein the display screen is arranged to display information indicating details of a person or entity responsible for the image capture device.

23. The detection system of claim 18, wherein the display screen is arranged to display information indicating details of a person or groups of people authorized to access images captured by the image capture device.

24. The detection system of claim 18, wherein the display screen is arranged to display information indicating licensing details.

25. The detection system of claim 13, wherein the remote detection unit further comprises a storage device arranged to store information carried by the radio signal.

26. The detection system of claim 13, wherein the radio transmitter emits the radio signal in response to an external stimulus.

27. The detection system of claim 26, wherein the image capture device further comprises a sensor to detect the external stimulus.

28. The detection system of claim 27, wherein the sensor is a motion detector or acoustic sensor.

29. The detection system of claim 26, wherein the remote detection unit further comprises the radio transmitter, wherein the radio receiver arranged to receive a query signal transmitted by the radio transmitter of the remote detection unit when the remote detection unit is within the predetermined range of the image capture device.

30. The detection system of claim 1, wherein the indicator unit is an infrared transmitter and the indicator signal is an infrared signal.

31. The detection system of claim 30, further comprising the remote detection unit carried by the person, the remote detection unit comprising an infrared receiver arranged to receive the infrared signal transmitted by the infrared transmitter of the image capture device when the infrared receiver is in the field of view of the infrared transmitter.

32. The detection system of claim 1, wherein the image capture device is a camera.

33. The detection system of claim 32, wherein the camera is a video camera.

34. The detection system of claim 1, wherein the image capture device is located in a public area.

35. A method for detecting the presence of an image capture device in the vicinity of a person, the method comprising:
  receiving a stimulus from outside the image capture device; and
  emitting an indicator signal that indicates the presence of the image capture device in the vicinity of the person, whereby detection of the indicator signal by a portable remote detection unit causes the portable remote detection unit to alert the person of the presence of the image capture device.

36. The method of claim 35, wherein receiving the stimulus further comprises receiving an acoustic signal.

37. The method of claim 35, wherein receiving the stimulus further comprises detecting motion.

38. The method of claim 35, wherein receiving the stimulus further comprises receiving a query signal from the portable remote detection unit carried by the person.

39. The method of claim 38, wherein emitting the indicator signal further comprises emitting a radio signal to the portable remote detection unit in response to the query signal.

40. The method of claim 35, wherein emitting the indicator signal further comprises emitting an audible alarm.

41. The method of claim 35, wherein emitting the indicator signal further comprises emitting a visible alarm.

42. A method comprising:
  transmitting a radio signal from an image capture device;
  receiving the radio signal by a remote detection unit carried by a person, wherein the radio signal is received when the parson is in the vicinity of the image capture device; and
  indicating the presence of the image capture device, via the remote detection unit, to the person in the vicinity of the image capture device.

43. The method of claim 42, wherein transmitting the radio signal comprises transmitting the radio signal periodically.

44. The method of claim 42, wherein indicating the presence of the image capture device further comprises emitting an audible alarm signal from the remote detection unit.

45. The method of claim 42, wherein indicating the presence of the image capture device further comprises emitting a visible alarm signal from the remote detection unit.

46. The method of claim 42, wherein indicating the presence of the image capture device further comprises vibrating the remote detection unit.

47. The method of claim 42, further comprising indicating the capabilities of the image capture device.

48. The method of claim 42, further comprising indicating the status of the image capture device.

49. The method of claim 42, further comprising indicating the details of the person or entity responsible for the image capture device.

50. The method of claim 42, further comprising indicating the details of the person or groups of people authorized to access images captured by the image capture device.

51. The method of claim 42, further comprising storing information carried by the radio signal.

52. A personal device, comprising:
  a transceiver configured to receive a radio signal transmitted by a remote image capture device, the signal indicating at least presence of the image capture device; and
  a warning device configured to indicate the presence of the image capture device to a person when in the vicinity of the image capture device,
  wherein the personal device is carried by the person.

* * * * *